United States Patent [19]
Ogata

[11] Patent Number: 5,949,577
[45] Date of Patent: Sep. 7, 1999

[54] LENS SYSTEM INCLUDING A DIFFRACTIVE OPTICAL ELEMENT

[75] Inventor: Yasuji Ogata, Akiruno, Japan

[73] Assignee: Olympus Optical Co., Ltd., Tokyo, Japan

[21] Appl. No.: 08/887,461

[22] Filed: Jul. 2, 1997

[30] Foreign Application Priority Data

Jul. 2, 1996 [JP] Japan .................................. 8-172373
Oct. 21, 1996 [JP] Japan .................................. 8-277793

[51] Int. Cl.⁶ ........................................................ G02B 5/30
[52] U.S. Cl. ........................... 359/565; 359/570; 359/738
[58] Field of Search ................................. 359/565, 569, 359/570, 738, 739, 740

[56] References Cited

U.S. PATENT DOCUMENTS

| | | | |
|---|---|---|---|
| 5,013,133 | 5/1991 | Buralli et al. | 359/565 |
| 5,148,314 | 9/1992 | Chen | 359/642 |
| 5,299,062 | 3/1994 | Ogata | 359/570 |
| 5,680,252 | 10/1997 | Sitter, Jr. et al. | 359/565 |
| 5,696,371 | 12/1997 | Meyers | 359/823 |
| 5,731,914 | 3/1998 | Meyers | 359/742 |

FOREIGN PATENT DOCUMENTS

| | | | |
|---|---|---|---|
| 6-59188 | 3/1994 | Japan | G02B 13/18 |
| 95/18393 | 7/1995 | WIPO | G02B 5/18 |

OTHER PUBLICATIONS

Patent Abstracts of Japan, Publication No. 06059188 re Appln. No. 04210389, published Mar. 4, 1994.

Patent Abstracts of Japan, Publication No. 06324262 re Appln. No. 05132446, published Nov. 25, 1994.

Stone et al, "Hybrid Diffractive–refractive lenses and achromats", Applied Optics, vol. 27, No. 14, Jul. 15, 1988 pp. 2960–2971.

*Primary Examiner*—Thong Nguyen
*Assistant Examiner*—John Juba, Jr.
*Attorney, Agent, or Firm*—Pillsbury, Madison & Sutro LLP

[57] ABSTRACT

A single lens of high performance and high image quality has a diffractive optical element and, more particularly, an optical system best suited for use on optical instruments for which chromatic aberrations must be corrected, e.g., silver halide or electronic cameras. The optical system has one positive lens and a stop. At least one surface of the positive lens is constructed of a diffractive surface $r_1$, and satisfies the condition $3 < f_D/f < 30$ where $f_D$ is a focal length of the diffractive surface, and f is a focal length of the entire lens system.

3 Claims, 6 Drawing Sheets

LENS SYSTEM INCLUDING A DIFFRACTIVE OPTICAL ELEMENT

BACKGROUND OF THE INVENTION

1. Field of the Invention

The present invention relates to a lens system including a diffractive optical element, or DOE for short, such as one including a diffractive surface having lens action based on a diffraction phenomenon. More particularly, this invention is directed to a lens system that can be applied to a phototaking optical system for use on cameras of simple construction such as silver halide or electronic cameras, each made up of one positive lens.

2. Description of Related Art

So far, single plastic lenses have been used for inexpensive cameras represented by films equipped with lenses. As is well known in the art, however, a single lens has a limited degree of freedom in correcting for aberrations, with which nothing can be done with the exception that the bending shape of the lens is chosen to minimize spherical aberration or to eliminate lower-order aberrations. In particular, it is essentially impossible to correction for chromatic aberrations, and Petzval image surface. Therefore, several countermeasures are proposed to solve these problems. The first countermeasure is to allow the surface of the film to have a cylindrical shape, so that the influence of field curvature can be undermined. The second is to increase the F-number of the lens so that the amount of spherical aberration, etc. produced can be reduced or the focal depth can be increased, thereby undermining the influence of chromatic aberrations. The increase in the focal depth makes focusing unnecessary and, hence, makes lens manipulation easy, and cost reductions possible. The third is to make use of an aspheric surface, thereby introducing some improvements in aberrations, all but the chromatic aberrations and Petzval image surface.

A typical example of such a single lens is disclosed in JP-A-6-59188. This is explained more illustratively with reference to Example 9 of this publication. A lens exemplified in Example 9 has a focal length of 30 mm and an F-number of 9.7, and uses aspheric surfaces on both its surfaces. This publication refers to the correlation of distortion and coma with respect to lens thickness and stop spacing, and concludes that the lens thickness is made small to reduce the distortion, and the stop spacing is made large for coma correction. Other aberrations are corrected by the two aspheric surfaces. The surface of the film takes a cylindrical shape having a radius of curvature of 80 mm to 300 mm. As can be seen from FIG. 13 or an aberration diagram of JP-A-6-59188, however, the aberration corrections achieved are still less than satisfactory, because the spherical aberration is about 1.2 mm for the maximum ray height, the longitudinal chromatic aberration is about 0.8 mm for the g-line, and the chromatic aberration of magnification is about 0.15 mm for the maximum field angle. This is also true of other prior art lenses.

If it is desired to design a camera of higher performance using a lens having a small F-number and an autofocus mechanism, it would then be impossible to use a conventional single lens, thereby achieving a practically acceptable camera. This would also hold for a so-called electronic camera with a CCD element incorporated therein as an image pickup surface.

As will be described later, the present invention has for its object to achieve a single lens of higher performance and higher image quality than ever before, using a DOE.

An account will here be given of a diffractive optical element or DOE for short. The DOE is interpreted at great length in "Optics", Vol. 22, pp. 635–642, and pp. 730–737, for instance.

Figure 1:
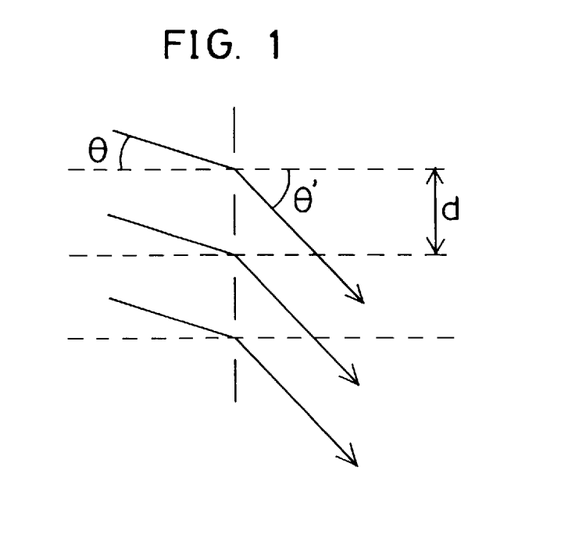
FIG. 1 illustrates the diffractive action of a diffracting grating.

A conventional lens is based on refracting action at an interface of the medium, whereas the DOE is based on the diffraction of light. Now assume that light is incident on such a diffraction grating as depicted in FIG. 1. In general, the light exiting the grating upon being diffracted then satisfies the following relation:

$$\sin\theta - \sin\theta' = m\lambda/d \quad (a)$$

where $\theta$ is the angle of incidence, $\theta'$ is the exit angle, $\lambda$ is the wavelength of the light, d is the pitch of the diffraction grating, and m is the order of diffraction. Therefore, if a ring form of diffraction grating is designed to have a proper pitch according to equation (a), it is then possible to focus light upon one point. In other words, the diffraction grating is allowed to have lens action. Here let $r_j$ and f represent the radius of a j-th grating ring and the focal length of a diffractive surface, respectively. Then, the following equation $$r_j^2 = 2j\lambda f \quad (b)$$

holds at a region to a first approximation.

Figure 2A:
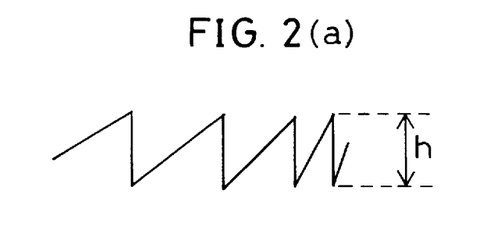
FIGS. 2(a) and 2(b) are sectional views of phase modulation type of diffractive optical elements.
Figure 2B:
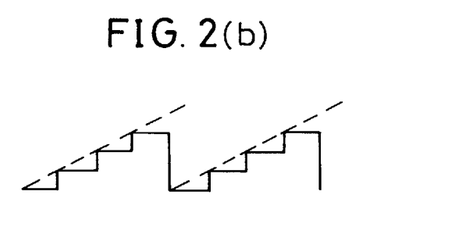

For the diffraction grating, several types are proposed, for instance, an amplitude modulation type made up of a bright-and-dark ring, and a phase modulation type with a variable refractive index or optical path length. In the amplitude type of DOE, the ratio between the quantity of incident light and the quantity of light subject to first-order diffraction (hereinafter called diffraction efficiency), for instance, is at most about 6% because light of plural orders of diffraction is generated. The amplitude modulation type of DOE, even when bleached or otherwise treated for diffraction efficiency improvements, has a diffraction efficiency of at most about 34%. However, the phase modulation type of DOE, if it is of a saw-tooth shape in section, as depicted in FIG. 2(a), can have a diffraction efficiency increased to 100%. Such a DOE is called a kinoform. Here the height of each sawtooth is given by $$h = m\lambda/(n-1) \quad (c)$$

where h is the height of the sawtooth, and n is the index of refraction of the substrate material. As can again be expected from equation (c), the diffraction efficiency of 100% is achievable for only one wavelength. A kinoform element, if it is to step approximation as depicted in FIG. 2(b), is often called a binary optical element, and can be relatively easily fabricated by lithographic techniques. The binary optical element is known to have a diffraction efficiency of 81%, 95%, and 99% according to 4-, 8-, and 16-step approximation, respectively.

Several techniques are known for DOE design. However, the ultra-high index technique is used in the present invention. This procedure, for instance, is shown in "Mathematical equivalence between a holographic optical element and ultra-high index lens", J. Opt. Sos. Am. 69, 486–487, "Using a conventional optical design program to design holographic optical elements", Opt. Eng. 19, 649–653, or the like. In other words, the DOE is known to be equivalent to a diffractive surface that has a thickness of 0 and a very high index of refraction.

When the DOE is used in the form of a lens, two important features are available. One feature is that the DOE has aspheric action; if the diffraction grating is designed to have a proper pitch, light can then be completely focused upon one point. This action is tantamount to using an aspheric surface to reduce the spherical aberration to zero. Another feature is that the DOE has very large color dispersion or, in another parlance, has an Abbe's number of −3.45. Thus, the DOE produces chromatic aberrations in the opposite direction, which is tens of times as large as that produced by the refractive action of conventional material. The fact that dispersion is large offers the gravest problem when the DOE is applied to a lens system used in natural light. The index of refraction of the DOE at an arbitrary wavelength is given by the following equation (d):

$$n(\lambda)=1+\{n(\lambda_0)-1\}\cdot\lambda/\lambda_0 \quad (d)$$

where X is an arbitrary wavelength, $n(\lambda)$ is the refractive index of the DOE at the wavelength $\lambda$, $\lambda_0$ is a reference wavelength, and $n(\lambda_0)$ is the refractive index of the DOE at the wavelength $\lambda_0$.

An example of such a DOE applied to a lens system used in natural light is known from "Hybrid diffractive-refractive lenses and achromats", Appl. Opt. 27, 2960–2971. This article gives a calculated value for the correction of chromatic aberrations made by use of a combination of a lens having an Abbe's number of −3.45 with a conventional glass lens on the basis of the principle of paraxial chromatic aberration correction. More specifically, the article discloses a lens having a convex surface on its object side and a plane surface on its image side, with a diffractive surface formed on the plane surface, and shows the achromatization of longitudinal chromatic aberration, and the remaining secondary spectrum. However, the article says nothing about chromatic aberration of magnification, and other aberrations. Nor is there any illustrative design data described therein.

WO95/18393 shows an exemplary arrangement comprising a positive meniscus lens that is convex on its subject side and a stop, with an image-side surface of the positive lens defined by a diffractive surface. According to this prior art arrangement, chromatic aberrations are corrected by use of a combination of a refractive system with a diffractive system, so that high performance can be achieved with no increase in the number of parts used. However, an arrangement set forth in the example of the aforesaid publication is poor in the ability to be formed and assembled because of small lens thickness. Another disadvantage of such an arrangement is that the overall lens length is somewhat long.

The applicant has filed a patent application, now published under JP-A-6-324262, wherein the application of a DOE to a telephoto lens is disclosed. As disclosed, a plane plate form of DOE is located in front of a conventional telephoto lens to improve the correction of chromatic aberrations. This arrangement is much more improved in terms of aberrations, but fails to take advantage of the DOE because of an increase in the number of parts involved.

SUMMARY OF THE INVENTION

In view of such problems associated with the prior art, it is an object of the invention to obtain a single lens of high performance and high image quality using a DOE, and provide an optical system best suited for optical instruments for which chromatic aberrations should be corrected, especially for silver halide or electronic cameras (for phototaking cameras). Another object of the invention is to provide an optical system, whose overall length is reduced by allowing a lens to have a suitable degree of thickness.

According to one aspect of the present invention, there is provided a lens system including a diffractive optical element, and comprising an optical system having one positive lens and a stop, characterized in that said positive lens has two surfaces, each of which has a curvature, and at least one of which is constructed of a diffractive surface, and characterized by satisfying the following condition (1):

$$3 < f_D/f < 30 \qquad (1)$$

where $f_D$ is a focal length of the diffractive surface, and f is a focal length of the entire lens system.

According to another aspect of the present invention, there is provided a lens system including a diffractive optical element, and comprising an optical system having one positive lens and a stop, characterized in that said positive lens has at least one diffractive surface, and characterized by satisfying the following conditions (1), and (2):

$$3 < f_D/f < 30 \qquad (1)$$

$$0.075 < d/f < 0.15 \qquad (2)$$

where $f_D$ is a focal length of the diffractive surface, f is a focal length of the entire lens system, and d is a thickness of the positive lens.

A detailed account will now be given of why the aforesaid arrangements are used, and how they work.

When only one surface of the positive single lens has a curvature, in other words, when aberrations are corrected by use of a combination of the plano-convex shape with the DOE, it is found that it is possible to make correction for longitudinal chromatic aberration and chromatic aberration of magnification, but the correction of coma becomes insufficient while considerable chromatic aberration of astigmatism is produced. With the plano-convex lens, therefore, no high performance is obtained even when it is used in combination with the DOE. It is thus desired to use a lens both surfaces of which have a curvature to make correction for fundamental aberrations at a reference wavelength. If, in this case, the lens is very thin, and is located closely to the stop, it is then preferable that the lens has a double-convex shape in view of the relation between the bending of the lens and aberrations. The closer the stop is to the lens, the more reduced the distortion and chromatic aberration of magnification are. However, this is not preferable because the correction of coma becomes insufficient. In order to place the performance of the entire picture plane in a well-balanced state while the coma is in a suitably corrected state, therefore, it is required that the lens be spaced sufficiently away from the stop.

Thus, it is generally required that the lens be separate from the stop, and have a suitable thickness, and so it is required that the positive lens be in a meniscus form with its concave surface directed toward the stop. In this way, it is possible to reduce coma, and other aberrations produced at the reference wavelength.

If at least one surface of the lens is constructed of a diffractive surface, it is then possible to correct chromatic aberrations by the combined action of the diffractive surface and the refractive system. Since, in this case, the Abbe's number of the diffractive surface has a negative value of −3.45, it is necessary to resort to the combination of positive powers to achieve the correction of the chromatic aberrations. The correction of the chromatic aberrations will now be explained below.

Assume here that $f_1$ and $v_1$ denote the focal length and Abbe's number of a first lens, and $f_2$ and $v_2$ indicate the focal length and Abbe's number of a second lens. Then, the composite focal length, and correction of paraxial chromatic aberration of a closely combined thin lens system are generally given by the following equations:

$$1/f = 1/f_1 + 1/f_2 \quad (e)$$

$$1/f_1 v_1 + 1/f_2 v_2 = 0 \quad (f)$$

where f is the composite focal length.

From these equations, it is known that the focal length of each lens is given by $$f_1 = (1 - v_2/v_1)f \quad (g)$$

$$f_2 = -(v_1/v_2 - 1)f \quad (h)$$

The focal length, and Abbe's number of the combined lens system are found from equations (g), and (h). Since, in the present invention, the diffractive surface has a negative value of −3.45, the combination of positive powers is necessary for the achievement of chromatic aberration correction.

If a conventional refractive system, approximated as a closely combined thin lens system, is constructed in conformity to equations (g), and (h), it is then possible to make satisfactory correction for both longitudinal chromatic aberration and chromatic aberration of magnification. In a single lens having a diffractive surface such as one according to the present invention, however, longitudinal chromatic aberration may be corrected, but chromatic aberration of magnification remains under-corrected because considerable higher-order aberrations are produced at the diffractive surface. For this reason, or in order to make sufficient correction for the chromatic aberration of magnification, the longitudinal chromatic aberration needs to be put in an over-corrected state. This is achievable by satisfying condition (1), so that high performance can be achieved over a wide field angle range. Condition (1) requires $$3 < f_D/f < 30, \quad (1)$$

where $f_D$ is the focal length of the diffractive surface, and f is the focal length of the entire lens system.

Here let $v_D$, and $v_R$ represent the Abbe's number of the diffractive surface, and the Abbe's number of the refractive system, respectively. Then, from the aforesaid equation (g), we obtain $$f_D/f = 1 - v_R/v_D. \quad (i)$$

For instance, $f_D/f = 9.7$ at $v_R = 30$, and $f_D/f = 18.4$ at $v_R = 60$, provided however that $v_D = -3.45$, as already noted. Equation (i) is provided to make correction for chromatic aberrations in the primary region. To put the longitudinal chromatic aberration in an over-corrected state, however, it is preferable that the value of $f_D/f$ is smaller than mentioned above. The condition to this end is condition (1). In the case of a phototaking optical system, such as a camera, chromatic aberrations are often corrected at g-line, and C-line because that system is used over a wide wavelength range. Exceeding the upper limit of 30 in condition (1) is not preferable because it then requires the use of expensive materials for the positive lens substrate. When the lower limit of 3 in condition (1) is not reached, on the other hand, no substrate material is available whatsoever.

Especially when the surface of the positive lens that is not opposite to the stop is constructed of a diffractive surface, it is desired to satisfy $$3 < f_D/f < 15. \quad (1)'$$

It is here noted that the smaller the Abbe's number of the lens substrate material, the larger the quantity of the secondary spectrum is. For this reason, or in order to achieve acceptable chromatic aberrations, it is desired to satisfy $$45 < v_D \quad (3)$$

where $v_D$ is an Abbe's number of a substrate material forming the diffractive optical element. At less than the lower limit of 45 in condition (3), the quantity of the secondary spectrum produced becomes unacceptably large.

To achieve acceptable chromatic aberrations, it is more preferable that condition (1) or (1)' reduces to $$6 < f_D/f < 12 \quad (1)''$$

Figure 3:
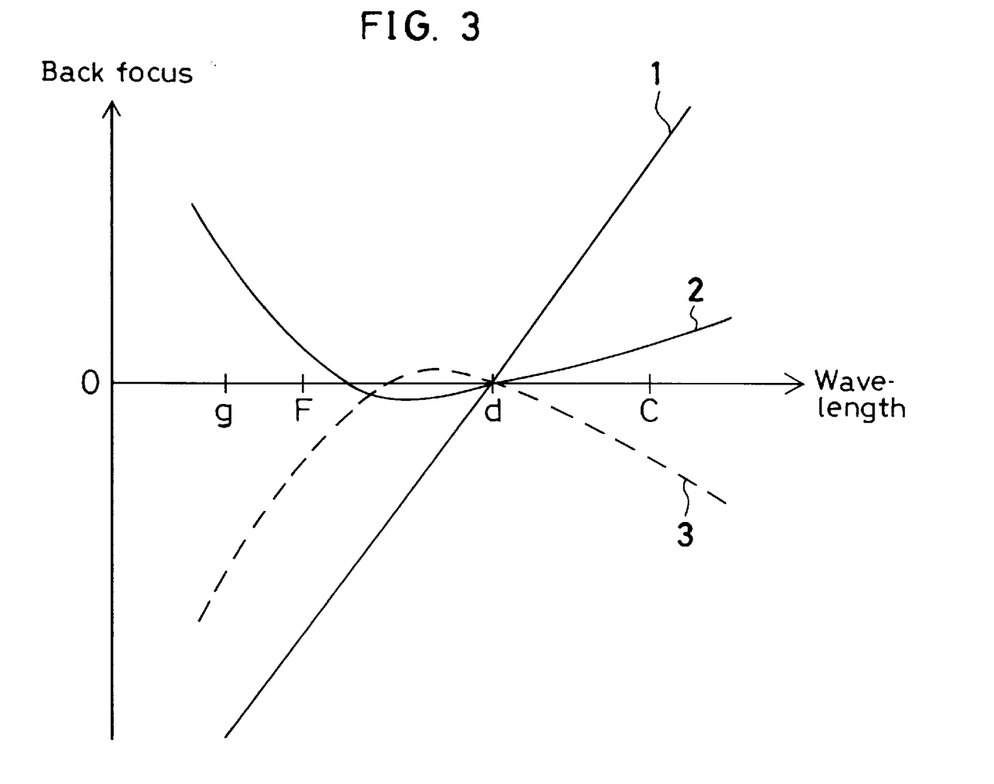
FIG. 3 is an illustration of how chromatic aberrations are corrected.
Figure 4:
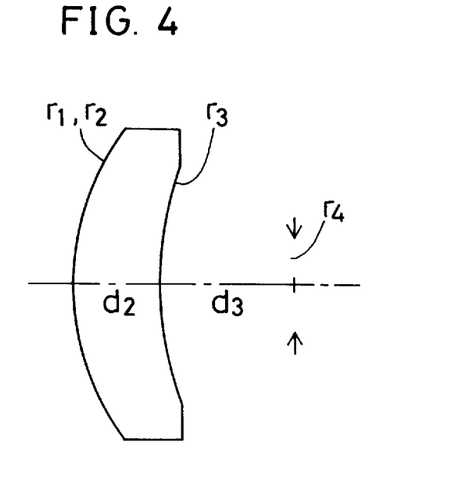
FIG. 4 is a sectional schematic of Example 1 of the lens system according to the invention.
Figure 5:
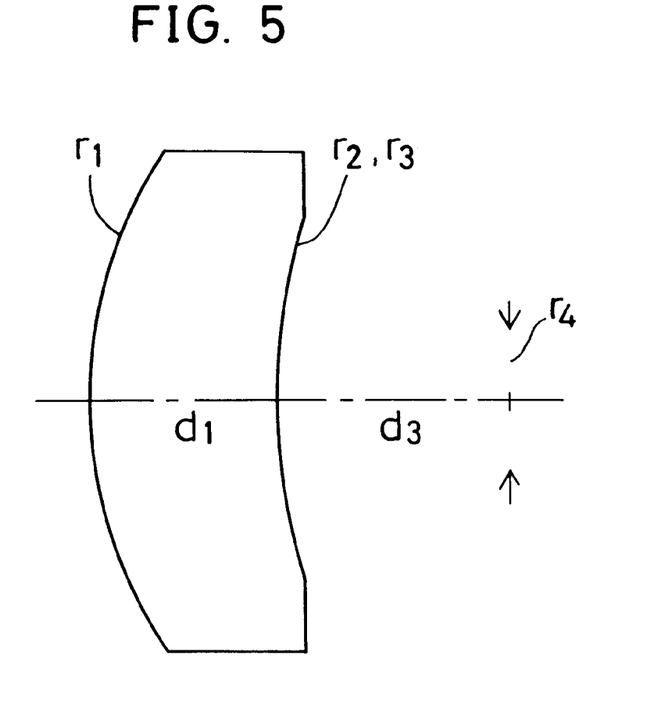
FIG. 5 is a sectional schematic of Example 2 of the lens system according to the invention.
Figure 6:
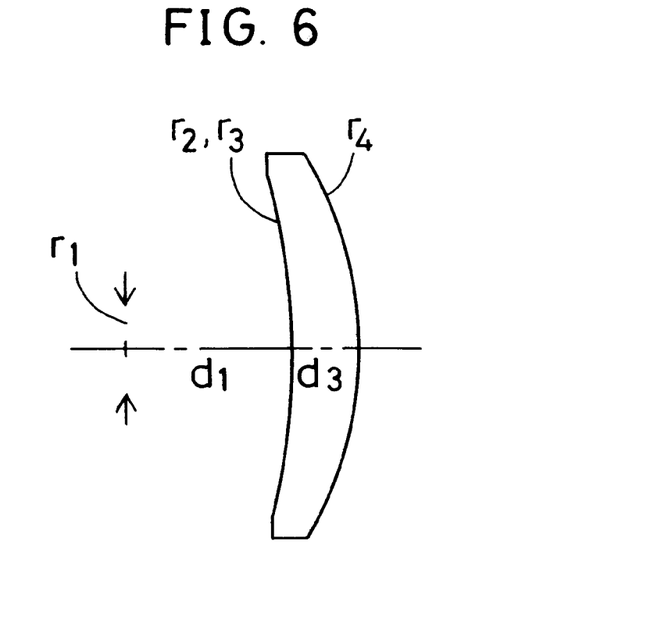
FIG. 6 is a sectional schematic of Example 3 of the lens system according to the invention.
Figure 7:
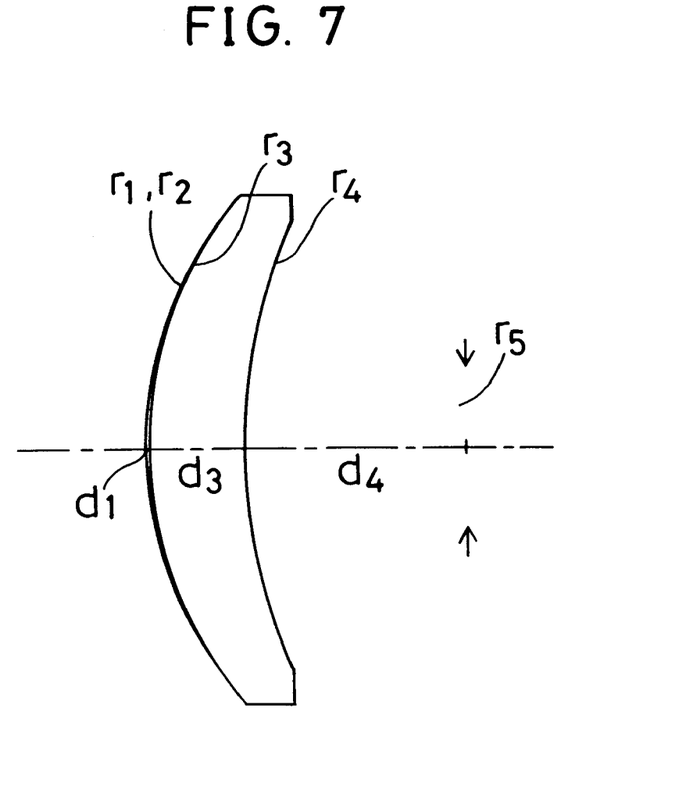
FIG. 7 is a sectional schematic of Example 4 of the lens system according to the invention.
Figure 8:
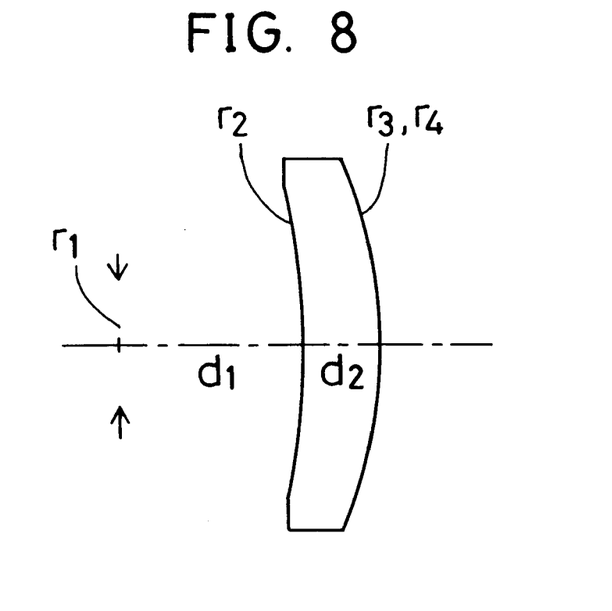
FIG. 8 is a sectional schematic of Example 7 of the lens system according to the invention.

Here consider the correction of chromatic aberrations made in conformity to equations (g), and (h). Between when the correction is made by use of a refractive system alone and when the correction is made by use of a refractive system combined with a diffractive surface, the results of the secondary spectrum differ entirely, as will be seen from FIG. 3 with wavelength as abscissa and image point position as ordinate. The ordinate corresponds to the quantity of the longitudinal chromatic aberration produced. From a curve 1 for a conventional single lens, it is found that the chromatic aberrations are not corrected at all. Thus, the image point has a large minus value on a short wavelength side. From a curve 2 for the correction of chromatic aberrations by the combination of refractive systems, it is found that achromatization occurs so that the image point at the F-line coincides with that at the C-line. At this time, the quantity of the secondary spectrum is over-corrected the g-line, for instance. A curve 3, on the other hand, illustrates how the chromatic aberrations are corrected by the combination of a diffractive surface with a refractive system, and indicates that achromatization occurs at the F-line and the C-line, as in the case of curve 2. However, the direction of the curve for the secondary spectrum is clearly reversed, and under-correction is observed at g-line. Such differences are due to a large negative dispersion that the diffractive surface has.

In the present invention, it is preferable that the diffractive surface is formed on the surface of the lens that is not opposite to the stop. In general, the positive lens used is a meniscus lens with its concave surface directed toward the stop. The positive lens has a small curvature on the surface opposite to the stop, and a large curvature on the surface that is not opposite to the stop. Consequently, the angle of incidence of an off-axis chief ray on the lens is large on the surface of the lens opposite to the stop, and small on the surface of the lens that is not opposite to the stop. To put it another way, the quantity of the chromatic aberration of magnification produced is large on the surface of the lens opposite to the stop, and small on the surface of the lens that is not opposite to the stop. Thus, if the surface of the positive lens opposite to the stop is constructed of a diffractive surface, it is then required to excessively increase the power of the diffractive surface to correction for the chromatic aberration of magnification, resulting in an increase in the secondary spectrum of the longitudinal chromatic aberration. If, on the other hand, the surface of the lens that is not opposite to the stop is constructed of a diffractive surface, it is then possible to correct for the chromatic aberration of magnification at that diffractive surface having a more reduced power, and hence to reduce the secondary spectrum. In other words, it is preferable to form the diffractive surface on the surface of the lens that is not opposite to the stop, thereby reducing the secondary spectrum of the longitudinal chromatic aberration.

It is also preferable that the thickness of the positive lens satisfies the following condition:

$$0.075 < d/f < 0.15 \qquad (2)$$

where f is the focal length of the entire lens system, and d is the thickness of the lens. Exceeding the upper limit of 0.15 in condition (2) is not preferable because the diameter of the lens becomes too large. That the lower limit of 0.075 in condition (2) is not reached is again not preferable in view of aberration correction, because the positive lens becomes thin, and so ray heights are close to each other on both surfaces of the positive lens. In addition, the performance of the lens becomes worse.

Use of a rear stop is effective for shortening the entire length of the lens system, because both surfaces of the positive lens have positive power and negative power, as viewed in order from the object side, providing a so-called telephoto type. If the thickness of the lens is determined such that condition (2) is satisfied, a telephoto effect is then easily achievable, making the overall length of the lens system much shorter.

By constructing the DOE as mentioned above, it is possible to make well-balanced correction for the longitudinal chromatic aberration and chromatic aberration of magnification, and aberrations at the reference wavelength. However, much higher performance is achievable by conforming to the following condition:

$$-0.5 < (r_A - r_B)/(r_A + r_B) < -0.1 \qquad (4)$$

where $r_A$ is a radius of curvature of a surface of a DOE substrate material having strong refracting power, and $r_B$ is a radius of curvature of a surface of the DOE substrate material having weak refracting power.

Condition (4) is provided to define the bending of the lens as well as to improve the chromatic aberration of astigmatism. By satisfying condition (4), the chromatic aberration of magnification is corrected. In some cases, accordingly, an image at each wavelength is not largely displaceable in an image plane (in a direction perpendicular to an optical axis), but largely displaceable in the optical axis direction. This can be explained with reference to a chief ray. The point of intersection of the chief ray with the image plane at each wavelength is not largely displaceable, but the position of the best image plane often varies per wavelength. In this situation, the chromatic aberration of astigmatism is large, and images at wavelengths other than the reference wavelength are considerably blurred; high performance is not expectable. Condition (4) is provided to allow such chromatic aberration of astigmatism to vanish. Exceeding the upper limit of −0.1 in condition (4) is not preferable because the radius of curvature becomes too small. That the lower limit of −0.5 in condition (4) is not reached, too, is not preferable because the radius of curvature becomes too large on the contrary.

According to the lens system of the present invention, it is impossible to correct for the Petzval sum, which is determined depending on the characteristics of the refractive system alone, because the diffractive surface makes no contribution to the Petzval sum. It is therefore preferable to bend the surface of the film because some considerable field curvature is produced. Alternatively, if an inorganic glass material having a high index of refraction is used, it is then possible to reduce the field curvature, even though it is produced. In this case, much difficulty is involved in forming a fine diffraction grating (of kinoform shape, for instance) on the surface of the glass. To avoid this difficulty, it is preferable to form a diffraction grating on a thin resin layer provided on the surface of the glass. For this resin, it is preferable in view of productivity to use resins of the type that is curable by ultraviolet radiation or heat.

The use of glass substrate material leads unavoidably to increased cost, regardless of whether a diffraction grating is formed directly on the surface thereof, or on a resin layer provided on the surface thereof. It is therefore preferable to form a diffraction grating on resin substrate material per se, because cost reductions are achievable. For the resin material it is common to use acrylic resins or polycarbonate resins. In view of performance, however, it is preferable to use a material having an Abbe's number of at least 45. It is here noted that generally available resin materials often vary in terms of the index of refraction, and surface shape depending on temperature, and humidity changes. It is therefore preferable to a resin material of low hygroscopicity because any possible lens change incidental to environmental humidity changes is avoidable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 16 of the lens system of the present invention including a diffractive optical element will now be explained.

The diffractive surface used in the lens system of the present invention has been designed using the ultra-high index technique, and is more specifically expressed in the form of a refractive lens having a refractive index of 1001 as measured at a thickness of 0 and a d-line wavelength. In numerical data given later, too, the diffractive surface is given by an ordinary aspherical formula as described below. That is, the aspherical shape is given by $$Z=CY^2/[1+\sqrt{1-(1+K)C^2Y^2}]+A_4Y^4+A_6Y^6+A_8Y^8+A_{10}Y^{10} \quad (j)$$

where Z is an axis representing an optical axis direction, Y is an axis representing a direction perpendicular to an optical axis, C is a curvature of a surface apex (=1/r where r is a radius of curvature), K is a conical coefficient, and $A_4$, $A_6$, $A_8$, and $A_{10}$ are fourth, sixth, eighth, and tenth aspherical coefficients, respectively.

A surface that is in contact with the diffractive surface at a thickness of 0 is a surface of DOE substrate material. In actual production, a phase change is first found from a difference between the aspherical shape of the diffractive surface and the surface shape of the substrate material, and the index of refraction. Then, this phase change is converted into the pitch of a diffraction grating, which is in turn formed on the surface of the substrate material. It follows that, in each of the examples given later, it is the surface of the substrate material which has finally lens action.

Some specific shapes of the diffractive surface, for instance, are shown in section in FIG. 10. A diffractive surface depicted in FIG. 10(a) comprises an alternation of transparent portions 21, and opaque portions 22 whose thickness is substantially zero, and is called an amplitude modulation type. A diffractive surface depicted in FIG. 10(b) comprises an alternation of portions having different indices of refraction, i.e., high-refractive-index portions 23 and low-refractive-index portions 24, and produces diffractive action through a phase difference due to a refractive index difference. A diffractive surface depicted in FIG. 10(c) comprises an alternation of convex and concave portions, each in a rectangular form, and produces diffractive action through a phase difference due to a thickness difference. This may be called a two-level binary element. A diffractive surface depicted in FIG. 10(d), called a kinoform, is in a saw-toothed form, and produces diffractive action through a phase difference due to a continuous thickness difference (see FIG. 2(a)). Diffractive surfaces depicted in FIGS. 10(e) and 10(f) are binary elements with the kinoform approximated at four, and eight levels, respectively (see FIG. 2(b)). In the present invention, it is desired to use the kinoform of FIG. 10(d), and the binary element of FIG. 10(e) or 10(f), with the kinoform approximated at four or more levels, because the quantity of light can effectively be used at an increased diffraction efficiency.

Shown in FIGS. 4 to 8 are sectional lens schematics of Examples 1, 2, 3, 4, and 7, each including an optical axis. Examples 5, 6, 8, 9, 10, 11, 12, 13, 14, 15, and 16 are not shown because of being similar to those shown in FIGS. 4, 5, 8, 6, 4, 8, 4, 5, 4, 8, and 4, respectively.

In reference to Examples 1, 4, 5, 10, 12, 14, and 16, the lens system is composed of a positive lens and a stop, as viewed in order from an object side thereof, and a surface of the lens located on the object side is constructed of a diffractive surface. In Examples 2, 6, and 13, the lens system is again composed of a positive lens and a stop, as viewed in order from an object side thereof, and a surface of the lens located on an image side of the lens system is constructed of a diffractive surface.

In reference to Examples 3, and 9, the lens system is composed of a stop and a positive lens, as viewed in order from an object side thereof, and a surface of the lens located on the object side is constructed of a diffractive surface. In Examples 7, 8, 11, and 15, the lens system is again composed of a stop and a positive lens, as viewed in order from an object side thereof, and a surface of the lens located on an image surface of the lens system is constructed of a diffractive surface.

In reference to Example 4, a kinoform is formed on a surface of a thin resin layer provided on a glass substrate material. In Examples 1, 2, 5, 8, 9, 13, 14, 15, and 16, a kinoform is formed on a so-called acrylic resin substrate material, and in Example 6, a kinoform is formed on a so-called polycarbonate resin substrate material. Referring to Examples 10, 11, and 12, a kinoform is formed on a polyolefinic resin substrate material of low hygroscopicity. Referring to Examples 3, and 7, a kinoform is formed on a glass substrate material.

The diffractive surface has a spherical shape in Examples 5, and 16, and an aspherical shape in other examples. In reference to the refractive surface of the substrate material, the image-side surface of Example 1, the object-side surface of Example 2, and the object-side surface of Example 8 have an aspherical shape.

Set out below are numerical data about Examples 1 to 16, wherein f=focal length, $F_{NO}$=F-number, $F_B$=back focus, ω=half field angle, $r_1$, $r_2$, etc.=radii of curvature of lens surfaces, $d_1$, $d_2$, etc.=spacing between lens surfaces, $n_{d1}$, $n_{d2}$, etc.=d-line refractive indices of lenses, and $\nu_{d1}$, $\nu_{d2}$, etc.= d-line Abbe's number. The aspherical shape is represented by the aforesaid equation (j). Note that the abbreviation "DIFFR. SF" indicates a diffractive surface.

EXAMPLE 1

$f = 40.05$ mm, $F_{NO} = 8.0$, $f_B = 29.82$ mm, $\omega = 26.7°$ $r_1 = 9.35985$ (DIFFR. SR)  $d_1 = 0$  $n_{d_1} = 1001$  $\nu_{d_1} = -3.45$
$r_2 = 9.36003$  $d_2 = 3.5$  $n_{d_2} = 1.49241$  $\nu_{d_2} = 57.66$
$r_3 = 14.457$ (Aspheric)  $d_3 = 5.1$
$r_4 = \infty$ (Stop)

Aspherical Coefficients

K=0
1st surface
$A_4 = -1.7289 \times 10^{-8}$
$A_6 = 2.1788 \times 10^{-9}$
$A_8 = -8.8514 \times 10^{-11}$
$A_{10} = 1.2680 \times 10^{-12}$
3rd surface
K=0
$A_4 = 9.2217 \times 10^{-5}$
$A_6 = -1.7654 \times 10^{-6}$
$A_8 = -1.6359 \times 10^{-7}$
$A_{10} = 8.3080 \times 10^{-9}$

EXAMPLE 2

$f = 50.01$ mm, $F_{NO} = 8.0$, $f_B = 35.53$ mm, $\omega = 22.3°$ $r_1 = 12.421$ (Aspheric)  $d_1 = 5.7$  $n_{d_1} = 1.49241$  $\nu_{d_1} = 57.66$
$r_2 = 18.70665$  $d_2 = 0$  $n_{d_2} = 1001$  $\nu_{d_2} = -3.45$
$r_3 = 18.70776$ (DIFFR. SR)  $d_3 = 6.9$
$r_4 = \infty$ (Stop)

Aspherical Coefficients

1st surface
K=-0.5953
$A_4 = 4.0664 \times 10^{-7}$
$A_6 = 1.6165 \times 10^{-6}$
$A_8 = -2.5003 \times 10^{-8}$
$A_{10} = 1.8218 \times 10^{-10}$
3rd surface
K=0
$A_4 = -2.3878 \times 10^{-8}$
$A_6 = 3.2489 \times 10^{-9}$
$A_8 = -1.3129 \times 10^{-10}$
$A_{10} = 1.9321 \times 10^{-12}$

EXAMPLE 3

$f = 28.00$ mm, $F_{NO} = 10.0$, $f_B = 29.10$ mm, $\omega = 41.0°$ $r_1 = \infty$ (Stop)  $d_1 = 5.0$
$r_2 = -19.60472$ (DIFFR. SR)  $d_2 = 0$  $n_{d_1} = 1001$  $\nu_{d_1} = -3.45$
$r_3 = -19.60302$  $d_3 = 2.0$  $n_{d_2} = 1.77250$  $\nu_{d_2} = 49.60$
$r_4 = -11.358$ Aspherical Coefficients 2nd surface
K=0
$A_4 = -4.2194 \times 10^{-8}$
$A_6 = 4.0969 \times 10^{-9}$
$A_8 = -1.8442 \times 10^{-12}$
$A_{10} = 3.2197 \times 10^{-12}$

EXAMPLE 4

$f = 35.08$ mm, $F_{NO} = 5.6$, $f_B = 24.69$ mm, $\omega = 29.2°$ $r_1 = 10.53841$ (DIFFR. SR)  $d_1 = 0$  $n_{d_1} = 1001$  $\nu_{d_1} = -3.45$
$r_2 = 10.53879$  $d_2 = 0.1$  $n_{d_2} = 1.52288$  $\nu_{d_2} = 52.50$
$r_3 = 10.53879$  $d_3 = 2.47$  $n_{d_3} = 1.72916$  $\nu_{d_3} = 54.68$
$r_4 = 14.624$  $d_4 = 6.3$
$r_5 = \infty$ (Stop)

Aspherical Coefficients

1st surface
K=0
$A_4 = -2.3481 \times 10^{-8}$
$A_6 = 5.9052 \times 10^{-10}$
$A_8 = -1.0936 \times 10^{-11}$
$A_{10} = 5.9429 \times 10^{-14}$

EXAMPLE 5

$f = 35.09$ mm, $F_{NO} = 10.0$, $f_B = 27.39$ mm, $\omega = 29.4°$ $r_1 = 7.73666$ (DIFFR. SR)  $d_1 = 0$  $n_{d_1} = 1001$  $\nu_{d_1} = -3.45$
$r_2 = 7.73685$  $d_2 = 2.8$  $n_{d_2} = 1.49241$  $\nu_{d_2} = 57.66$
$r_3 = 11.239$  $d_3 = 3.3$
$r_4 = \infty$ (Stop)

EXAMPLE 6

$f = 34.99$ mm, $F_{NO} = 8.0$, $f_B = 26.70$ mm, $\omega = 29.7°$ $r_1 = 8.635$  $d_1 = 2.2$  $n_{d_1} = 1.58423$  $\nu_{d_1} = 30.49$
$r_2 = 11.63195$  $d_2 = 0$  $n_{d_2} = 1001$  $\nu_{d_2} = -3.45$
$r_3 = 11.63291$ (DIFFR. SR)  $d_3 = 5.0$
$r_4 = \infty$ (Stop)

Aspherical Coefficients

3rd surface
K=0
$A_4=6.2514\times10^{-8}$
$A_6=-4.0455\times10^{-9}$
$A_8=1.6008\times10^{-10}$
$A_{10}=-2.3132\times10^{-12}$

EXAMPLE 7

$f = 35.02$ mm, $F_{NO} = 10.0$, $f_B = 36.70$ mm, $\omega = 33.4°$ $r_1 = \infty$ (Stop)         $d_1 = 5.3$
$r_2 = -19.476$               $d_2 = 2.1$  $n_{d_1} = 1.80518$  $v_{d_1} = 25.43$
$r_3 = -13.13493$             $d_3 = 0$    $n_{d_2} = 1001$     $v_{d_2} = -3.45$
$r_4 = -13.13400$ (DIFFR. SR)

Aspherical Coefficients
4th surface
K=0
$A_4=2.8820\times10^{-8}$
$A_6=-2.4872\times10^{-9}$
$A_8 9.0522\times10^{-11}$
$A_{10}=-1.2789\times10^{-12}$

EXAMPLE 8

$f = 28.13$ mm, $F_{NO} = 10.0$, $f_B = 29.95$ mm, $\omega = 40.9°$ $r_1 = \infty$ (Stop)         $d_1 = 2.1$
$r_2 = -17.405$ (Aspheric)    $d_2 = 3.4$  $n_{d_1} = 1.49241$  $v_{d_1} = 57.66$
$r_3 = -8.78033$              $d_3 = 0$    $n_{d_2} = 1001$     $v_{d_2} = -3.45$
$r_4 = -8.78003$ (DIFFR. SR)

Aspherical Coefficients

2nd surface
K=-3.7483
$A_4=-1.1079\times10^{-6}$
$A_6=-4.3796\times10^{-5}$
$A_8=1.0864\times10^{-5}$
$A_{10}=-8.6209\times10^{-7}$
4th surface
K=0
$A_4=1.0720\times10^{-7}$
$A_6=-1.7234\times10^{-8}$
$A_8=1.1880\times10^{-9}$
$A_{10}=-3.1276\times10^{-11}$

EXAMPLE 9

$f = 35.01$ mm, $F_{NO} = 10.0$, $f_B = 36.36$ mm, $\omega = 33.6°$ $r_1 = \infty$ (Stop)              $d_1 = 5.0$
$r_2 = -27.31349$ (DIFFR. SR)      $d_2 = 0$    $n_{d_1} = 1001$     $v_{d_1} = -3.45$
$r_3 = -27.31115$                  $d_3 = 3.7$  $n_{d_2} = 1.51633$  $v_{d_2} = 64.15$
$r_4 = -12.095$ Aspherical Coefficients 2nd surface
K=0
$A_4=-4.7099\times10^{-8}$
$A_6=5.4520\times10^{-9}$
$A_8=-2.7932\times10^{-10}$
$A_{10}=5.1518\times10^{-12}$

EXAMPLE 10

$f = 34.91$ mm, $F_{NO} = 8.0$, $f_B = 26.42$ mm, $\omega = 29.6°$ $r_1 = 8.46962$ (DIFFR. SR)   $d_1 = 0$    $n_{d_1} = 1001$     $v_{d_1} = -3.45$
$r_2 = 8.46986$               $d_2 = 2.8$  $n_{d_2} = 1.52542$  $v_{d_2} = 55.78$
$r_3 = 12.587$                $d_3 = 4.3$
$r_4 = \infty$ (Stop)

Aspherical Coefficients
1st surface
K=0
$A_4=-3.7712\times10^{-8}$
$A_6=-1.9069\times10^{-9}$
$A_8=-6.0866\times10^{-11}$
$A_{10}=6.6391\times10^{-13}$

EXAMPLE 11

$f = 34.99$ mm, $F_{NO} = 10.0$, $f_B = 35.80$ mm, $\omega = 34.0°$ $r_1 = \infty$ (Stop)              $d_1 = 6.4$
$r_2 = -67.100$                    $d_2 = 4.5$  $n_{d_1} = 1.52542$  $v_{d_1} = 55.78$
$r_3 = -15.88033$                  $d_3 = 0$    $n_{d_2} = 1001$     $v_{d_2} = -3.45$
$r_4 = -15.87970$ (DIFFR. SR)

Aspherical Coefficients

4th surface
K=0
$A_4=9.3943\times10^{-9}$
$A_6=-1.6509\times10^{-10}$
$A_8=2.2255\times10^{-12}$
$A_{10}=-1.2518\times10^{-14}$

EXAMPLE 12

$f = 35.05$ mm, $F_{NO} = 10.0$, $f_B = 26.38$ mm, $\omega = 29.5°$ $r_1 = 7.52470$ (DIFFR. SR)   $d_1 = 0$    $n_{d_1} = 1001$     $v_{d_1} = -3.45$
$r_2 = 7.52486$               $d_2 = 2.8$  $n_{d_2} = 1.52542$  $v_{d_2} = 55.78$
$r_3 = 10.320$                $d_3 = 4.0$
$r_4 = \infty$ (Stop)

Aspherical Coefficients

1st surface
K=0
$A_4=-3.2062\times10^{-8}$
$A_6=2.4717\times10^{-9}$ $A_8 = -9.9425 \times 10^{-11}$
$A_{10} = 1.3675 \times 10^{-12}$

EXAMPLE 13

$f = 35.04$ mm, $F_{NO} = 10.0$, $f_B = 26.71$ mm, $\omega = 29.5°$

| | | | |
|---|---|---|---|
| $r_1 = 7.922$ | $d_1 = 2.9$ | $n_{d_1} = 1.49241$ | $\nu_{d_1} = 57.66$ |
| $r_2 = 11.56682$ | $d_2 = 0$ | $n_{d_2} = 1001$ | $\nu_{d_2} = -3.45$ |
| $r_3 = 11.56740$ (DIFFR. SR) | $d_3 = 4.1$ | | |
| $r_4 = \infty$ (Stop) | | | |

Aspherical Coefficients

3rd surface
K=0
$A_4 = 6.4050 \times 10^{-8}$
$A_6 = -4.9665 \times 10^{-9}$
$A_8 = 2.1745 \times 10^{-10}$
$A_{10} = -2.5989 \times 10^{-12}$

EXAMPLE 14

$f = 44.99$ mm, $F_{NO} = 10.0$, $f_B = 33.50$ mm, $\omega = 24.5°$

| | | | |
|---|---|---|---|
| $r_1 = 10.34363$ (DIFFR. SR) | $d_1 = 0$ | $n_{d_1} = 1001$ | $\nu_{d_1} = -3.45$ |
| $r_2 = 10.34385$ | $d_2 = 3.6$ | $n_{d_2} = 1.49241$ | $\nu_{d_2} = 57.66$ |
| $r_3 = 15.799$ | $d_3 = 6.1$ | | |
| $r_4 = \infty$ (Stop) | | | |

Aspherical Coefficients

1st surface
K=0
$A_4 = -1.5807 \times 10^{-8}$
$A_6 = 8.4078 \times 10^{-10}$
$A_8 = -2.6139 \times 10^{-11}$
$A_{10} = 2.7852 \times 10^{-13}$

EXAMPLE 15

$f = 44.95$ mm, $F_{NO} = 10.0$, $f_B = 47.33$ mm, $\omega = 26.7°$

| | | | |
|---|---|---|---|
| $r_1 = \infty$ (Stop) | $d_1 = 5.3$ | | |
| $r_2 = -37.350$ | $d_2 = 6.0$ | $n_{d_1} = 1.49241$ | $\nu_{d_1} = 57.66$ |
| $r_3 = -15.49698$ | $d_3 = 0$ | $n_{d_2} = 1001$ | $\nu_{d_2} = -3.45$ |
| $r_4 = -15.49653$ (DIFFR. SR) | | | |

Aspherical Coefficients

4th surface
K=0
$A_4 = 1.5193 \times 10^{-8}$
$A_6 = -9.3462 \times 10^{-10}$
$A_8 = 2.2678 \times 10^{-11}$
$A_{10} = -1.8027 \times 10^{-13}$

EXAMPLE 16

$f = 34.97$ mm, $F_{NO} = 10.0$, $f_B = 26.87$ mm, $\omega = 29.4°$

| | | | |
|---|---|---|---|
| $r_1 = 7.73738$ (DIFFR. SR) | $d_1 = 0$ | $n_{d_1} = 1001$ | $\nu_{d_1} = -3.45$ |
| $r_2 = 7.73753$ | $d_2 = 3.2$ | $n_{d_2} = 1.49241$ | $\nu_{d_2} = 57.66$ |
| $r_3 = 11.253$ | $d_3 = 3.14$ | | |
| $r_4 = \infty$ (Stop) | | | |

Figures 9A, 9B, 9C:
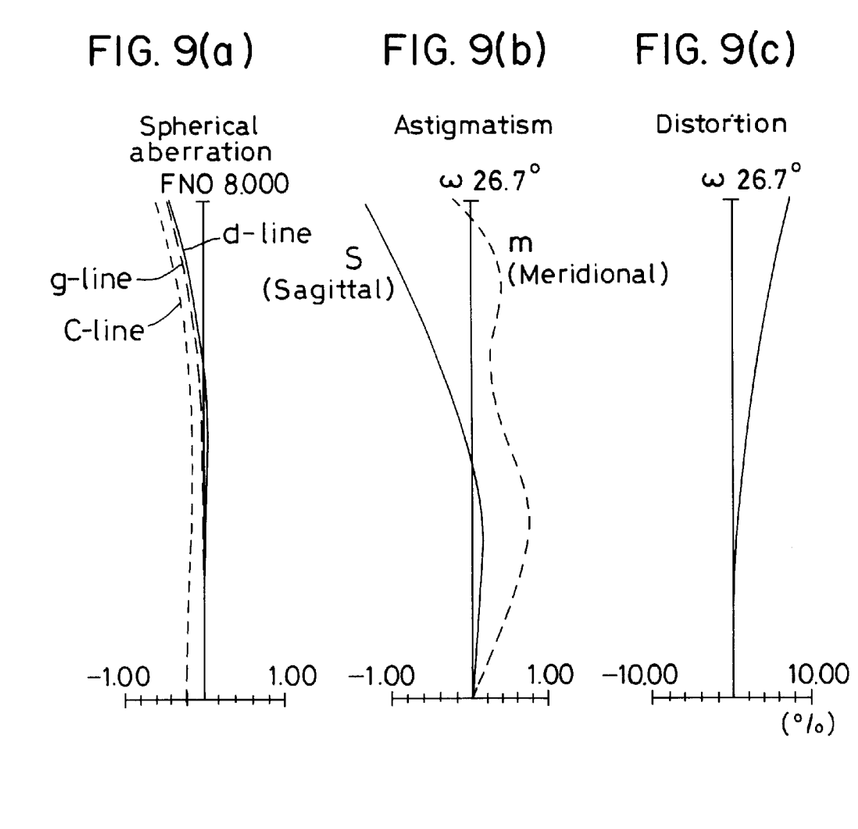
FIGS. 9(a)–9(e) are aberration diagrams of Example 1.
Figure 9D:
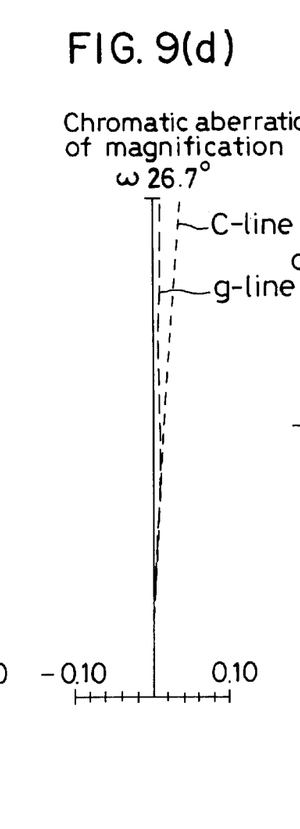
Figure 9E:
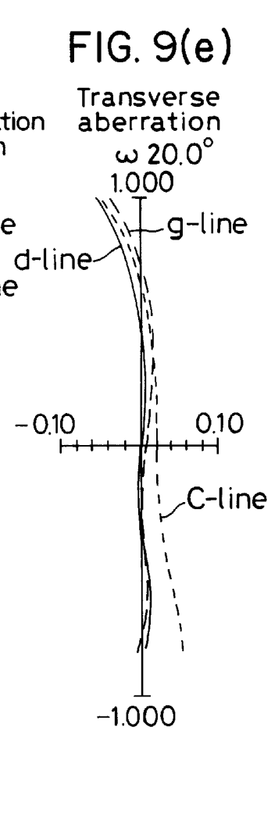
Figure 10A:
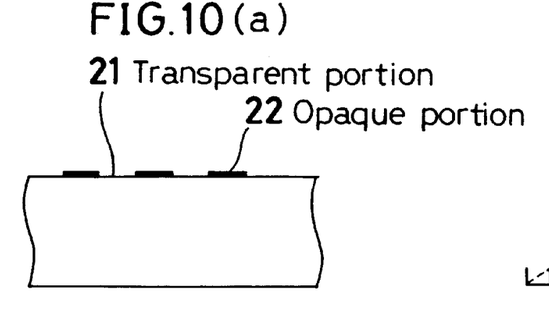
FIGS. 10(a)–10(f) are sectional schematics of exemplified shape of diffractive surface used in the invention.
Figures 10B, 10F:
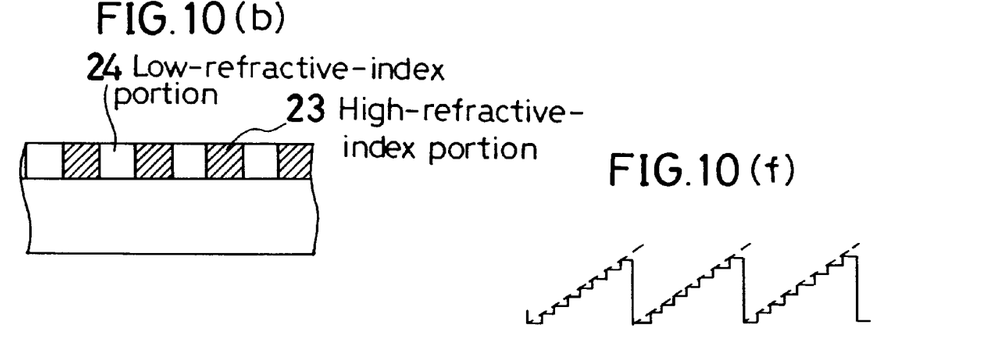
Figure 10C:
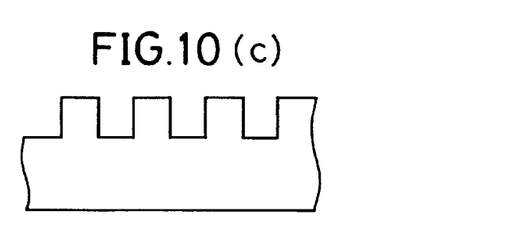
Figure 10D:
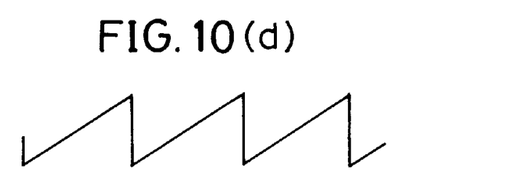
Figure 10E:
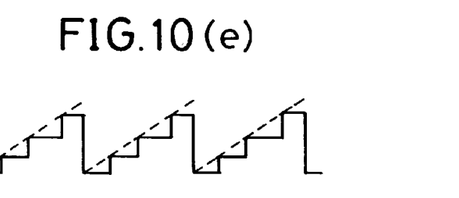

FIG. 9 is an aberration diagram showing the spherical aberration, astigmatism, distortion, chromatic aberration of magnification, and transverse aberration of Example 1 with respect to an object point at infinity.

Tabulated below are values of f, $f_D$, $f_D/f$=(1), d, d/f=(2), $r_A$, $r_B$, and $(r_A - r_B)/(r_A + r_B)$=(4) in Examples 1 to 16.

| | Ex. 1 | Ex. 2 | Ex. 3 | Ex. 4 | Ex. 5 |
|---|---|---|---|---|---|
| f | 40.5 | 50.01 | 28 | 35.08 | 35.09 |
| $f_D$ | 486.7138 | 315.2788 | 226.0657 | 292.2687 | 315.0388 |
| (1) | 12.15 | 6.30 | 8.07 | 8.33 | 8.98 |
| d | 3.5 | 5.7 | 2 | 2.7 | 2.8 |
| (2) | 0.087 | 0.114 | 0.071 | 0.077 | 0.080 |
| $r_A$ | 9.36003 | 12.421 | -11.358 | 10.53879 | 7.73685 |
| $r_B$ | 14.459 | 18.70665 | -19.60302 | 14.624 | 11.239 |
| (4) | -0.21 | -0.20 | -0.27 | -0.16 | -0.18 |
| | Ex. 6 | Ex. 7 | Ex. 8 | Ex. 9 | Ex. 10 |
| f | 34.99 | 35.02 | 28.13 | 35.01 | 34.91 |
| $f_D$ | 140.9515 | 185.4991 | 256.9719 | 318.7875 | 298.9021 |
| (1) | 4.03 | 5.30 | 9.14 | 9.11 | 8.56 |
| d | 2.2 | 2.1 | 3.4 | 3.7 | 2.8 |
| (2) | 0.063 | 0.060 | 0.121 | 0.106 | 0.080 |
| $r_A$ | 8.635 | -13.13993 | -8.78033 | -12.095 | 8.46986 |
| $r_B$ | 11.63195 | -19.476 | -17.405 | -27.31115 | 12.587 |
| (4) | -0.15 | -0.19 | -0.33 | -0.39 | -0.20 |
| | Ex. 11 | Ex. 12 | Ex. 13 | Ex. 14 | Ex. 15 |
| f | 34.99 | 35.05 | 35.04 | 44.99 | 44.95 |
| $f_D$ | 400.2856 | 354.005 | 230.5632 | 486.3419 | 533.5565 |
| (1) | 11.44 | 10.1 | 6.58 | 10.81 | 11.87 |
| d | 4.5 | 2.8 | 2.9 | 3.6 | 6 |
| (2) | 0.129 | 0.080 | 0.083 | 0.080 | 0.133 |
| $r_A$ | -15.8803 | 7.52486 | 7.922 | 10.34385 | -15.49698 |
| $r_B$ | -67.1 | 10.32 | 11.56682 | 15.799 | -37.35 |
| (4) | -0.62 | -0.16 | -0.19 | -0.21 | -0.41 |
| | Ex. 16 | | | | |
| f | 34.97 | | | | |
| $f_D$ | 399.0077 | | | | |
| (1) | 11.41 | | | | |
| d | 3.2 | | | | |
| (2) | 0.092 | | | | |
| $r_A$ | 7.73753 | | | | |
| $r_B$ | 11.253 | | | | |
| (4) | -0.19 | | | | |

As can be understood from the foregoing explanation, the lens system of the present invention, albeit being a single lens, makes it possible to properly locate a diffractive surface therein, thereby achieving performance as high as unachievable with a conventional refractive lens. This in turn enables optical tools used in white light, e.g., silver halide or electronic cameras to have much higher performance.

What we claim is:

1. A lens system including a diffractive optical element, and comprising an optical system having one positive lens and a stop, characterized in that said positive lens has at least one diffractive surface, and characterized by satisfying the following conditions:

$3 < f_D/f < 30$ $0.121 < d/f < 0.15$ where $f_D$ is a focal length of the diffractive surface, f is a focal length of the entire lens system, and d is a thickness of the positive lens.

2. A lens system including a diffractive optical element, and comprising an optical system having one positive lens and a stop in order from an object side thereof, characterized in that said positive lens has at least one diffractive surface, and characterized by satisfying the following conditions:

$3 < f_D/f < 15$ $0.121 < d/f < 0.15$ where $f_D$ is a focal length of the diffractive surface, f is a focal length of the entire lens system, and d is a thickness of the positive lens.

3. A lens system including a diffractive optical element, and comprising an optical system having one positive lens and a stop, characterized in that said positive lens has at least one diffractive surface, and characterized by satisfying the following conditions (1), and (2):

$3 < f_D/f < 30$ (1)

$0.121 < d/f < 0.15$ (2)

where $f_D$ is a focal length of the diffractive surface, f is a focal length of the entire lens system, and d is a thickness of the positive lens, and characterized by comprising a stop and a positive lens in that order from an object side thereof.

* * * * *